June 8, 1965 J. W. HARRISON 3,187,380
APPARATUS FOR USE IN MAKING REINFORCED EDGE APERTURES
IN HEAT SHRINKABLE MATERIAL
Original Filed March 21, 1961 2 Sheets-Sheet 1
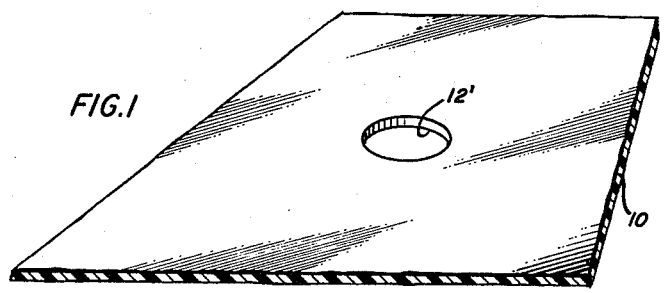
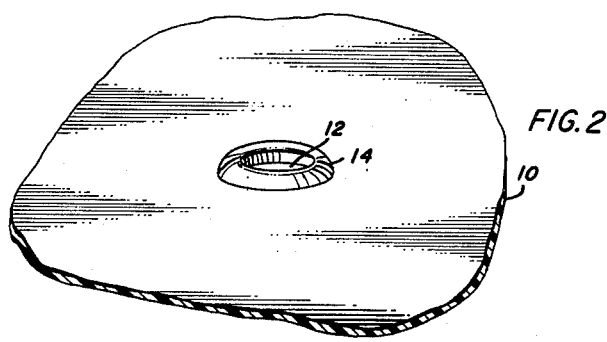
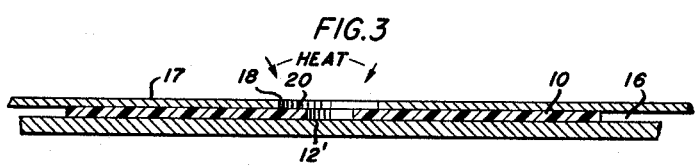
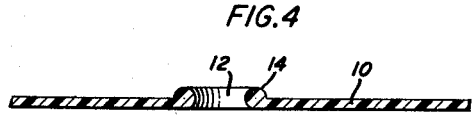
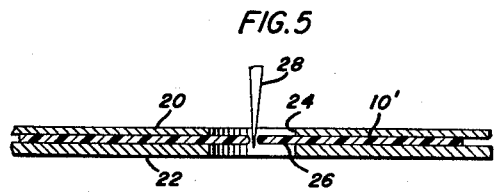
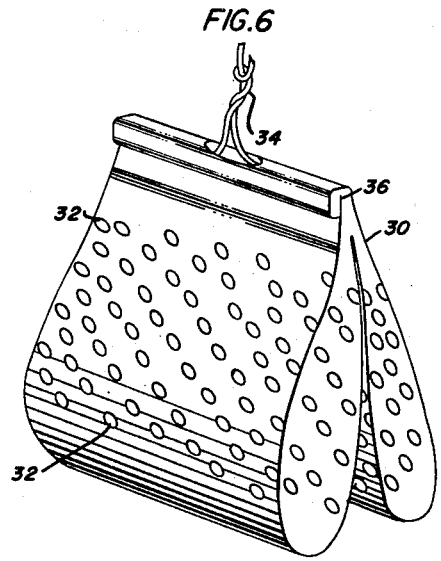
INVENTOR
JOHN W. HARRISON
BY Cushman, Darby & Cushman
ATTORNEYS

United States Patent Office 3,187,380
Patented June 8, 1965

3,187,380
APPARATUS FOR USE IN MAKING REINFORCED EDGE APERTURES IN HEAT SHRINKABLE MATERIAL
John W. Harrison, Winchester, Mass., assignor to W. R. Grace & Co., Cambridge, Mass., a corporation of Connecticut
Original application Mar. 21, 1961, Ser. No. 97,307, now Patent No. 3,092,439, dated June 4, 1963. Divided and this application July 20, 1962, Ser. No. 219,093
4 Claims. (Cl. 18—1)

This application is a division of my copending application Serial No. 97,307, filed March 21, 1961, which issued as U.S. Patent No. 3,092,439 on June 4, 1963. Application Serial No. 97,307 in turn is a continuation-in-part of my application Serial No. 854,385, filed November 20, 1959, now abandoned.

The present invention relates to an apparatus for making a reinforced edge on an aperture in heat shrinkage material.

In the use of heat shrinkable film, especially in the packaging field, it has been found necessary to provide holes or apertures, the holes or apertures serving various purposes. Heretofore, the apertures have been merely die cut or dinked in the film and such formed apertures have had limited usefulness due to the film's low resistance to tear propagation. In other words, such apertures cannot stand much stress as a tear can start in their edges. Once a tear starts, it will propagate rapidly through the material.

An important object of the present invention is to provide an apparatus for use in making a preliminary aperture in a heat shrinkable material, the aperture, when the material is heat shrunk, being so formed as to decrease the danger of tears starting from the edges of the apertures.

The present invention is particularly applicable to packages requiring apertures. A typical package would be one requiring a pour hole, a hole for the lifting ring of a packaged electric motor. Another example of the us of a heat shrinkable material having apertures would be the packaging of food products such as tea and coffee in bags. In each instance, it is highly desirable that the apertures in the material making up the package be provided with edges that are of a greater tear resistance than the film of the package.

Another object of the present invention is to provide an apparatus for preliminarily perforating a heat shrinkable material with an aperture having a thinned out or feathered edge so that when heat is applied in a localized area about the preformed aperture, it causes the material to shrink back and form an aperture of desired size.

These and other objects and advantages of the present invention will appear more fully in the following specification, claims and drawings in which:

FIGURE 1 is a fragmentary perspective view of a sheet of heat shrinkable material having a preformed aperture therein;

FIGURE 2 is a fragmentary perspective view of a sheet of heat shrinkable material, the preformed apertured having been formed to its final configuration;

Figure 7:
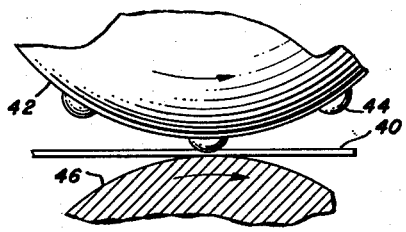
Figure 8:
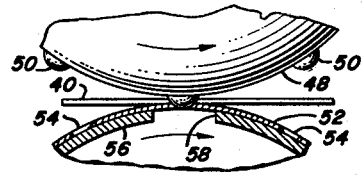
Figure 9:
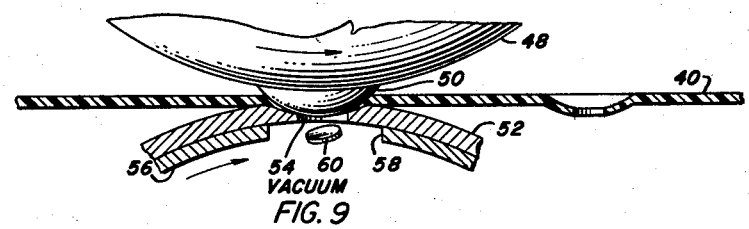
Figure 10:
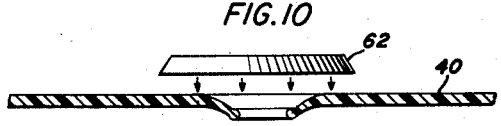
Figure 11:
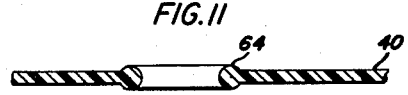
Figure 12:
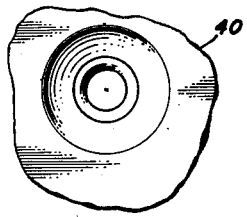

FIGURE 3 discloses a sectional view showing one method of forming the aperture in a sheet of heat shrinkable material according to the present invention;

FIGURE 4 is a sectional view of the aperture formed by the method of FIGURE 3;

FIGURE 5 is a sectional view of a modified method showing the forming of an aperture in a piece of heat shrinkable material according to the present invention;

FIGURE 6 is a perspective view of a tea bag or the like made in accordance with the present invention;

FIGURE 7 is a schematic sectional view of an apparatus for preforming holes in a piece of heat shrinkable material according to the present invention;

FIGURE 8 is another schematic sectional view illustrating modified apparatus for forming a preformed hole in a piece of heat shrinkable material according to the present invention;

FIGURE 9 is an enlarged fragmentary cross-sectional view of the apparatus in FIGURE 8, the view further illustrating the feathered or thinned out edge on the preformed aperture;

FIGURE 10 illustrates application of heat in a localized area to the preformed aperture formed in accordance with either FIGURES 7 or 8;

FIGURE 11 is a sectional view through an aperture formed in accordance with the present invention and illustrating its final configuration;

FIGURE 12 is a fragmentary top plan view of a preformed aperture just after localized heat has been applied thereto showing the formation of the thickened flexible edge.

Referring now to the drawings in which like character or reference numerals represent like or similar parts, the present invention relates to a method of providing an aperture in a film 10 of heat shrinkable material, the aperture being generally designated at 12 and having a reinforced thickened flexible edge 14. As mentioned at the outset of the specification, apertures have been provided in heat shrinkable material by die cutting the hole but such apertures had limited usefulness as tears would propagate from the edges of the aperture through the film or sheet of material. Also, it might be mentioned that apertures have been made in nylon fabric used for watch straps or the like by inserting a heated awl through the fabric which fuses the edges. However, this type of aperture is limited in its usefulness since the edge is stiffened by the fusing of the nylon.

Preferably, the heat shrinkable material employed in the present invention is biaxially oriented polyethylene having a shrink energy of 250 p.s.i. at 96° C. The biaxially oriented polyethylene was prepared by irradiating Alathon 14 (polyethylene, molecular weight about 20,000, density 0.916) to a dosage of 12 megarad and then stretching 350% in both directions.

There can be employed as the starting polyethylene for the irradiation procedure high, low or medium density polyethylene prepared by low or high pressure techniques. The starting polyethylene can have a molecular weight of 7,000 or 12,000 or 19,000 or 21,000 or 24,000 or 35,000 or even higher.

In general, the polyethylene employed in the present invention is a film or tubing which has been irradiated to an extent of 2 to 100 megarad, preferably 6 to 20 megarad. The irradiation can be accomplished in conventional fashion, e.g., by the use of a high voltage resonant transformer, such as the 2,000,000 volt General Electric resonant transformer, or high energy particle generators of 50,000 to 50,000,000 volts, or a Van de Graaff electron generator. In addition to the use of electrons, there can be employed beta rays, gamma rays, e.g., by employing cobalt 60, etc. There can be employed any of the irradiation procedures disclosed in Baird application, Serial No. 713,848 filed February 7, 1958, or Rainer Patent 2,877,500, for example. The entire disclosure of the Baird application and the Rainer patent is hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the Baird application. The irradiated biaxially oriented polyethylene prepared by such a procedure has a high shrink energy, e.g., 100 to 500 p.s.i. at 96° C.

In place of irradiated polyethylene, there can be employed similarly irradiated polypropylene or polypropylene which has not been irradiated.

Referring to FIGURES 1, 2 and 3, the aperature 12 in a film of biaxially oriented irradiated polyethylene 10 can be formed with a thickened edge portion 14 which is flexible and less oriented as well as having a high tear resistance by placing the sheet 10 with a preformed aperture 12' on a flat surface 16. The preformed aperture 12' can be made by die cutting the hole and it is important that the aperture be free of any nicks or irregularities prior to the forming of the aperture of final configuration. In FIGURE 1, the aperture is shown in circular form but it is, of course, within the scope of the invention that the aperture can be any desired shape such as oval, rectangular or the like.

After the sheet 10 has been placed on the flat surface 16 with the preformed aperture 12' already cut therein, a thermally insulating mask 17 having an aperture 18 of the same shape as the preformed aperture 12' is placed over the film 10 so that the aperture 18 is concentric with the aperture 12'. The aperture 18 is substantially the same size as the aperture which is to be made in the film 10. Heat is then applied to the area 20 of the film 10 which is uninsulated and the edges of the aperture 12' will shrink back and thicken so as to form the aperture 12 with the thickened edge 14. The heat which is applied may be in the form of a radiant heat source, a blast of hot air, or the like. The resultant edge 14 of the aperture 12 is thicker and less oriented than the film 10 and, consequently, the tear resistance of the edge 14 is materially increased.

Referring now to FIGURE 5, a modified method of forming the aperture 12 in a film of biaxially oriented irradiated polyethylene is disclosed. In this instance, a sheet 10' of the polyethylene film is clamped between upper and lower plates 20 and 22, respectively. The plates 20 and 22 are provided with mated apertures 24 and 26 having the desired shape and substantial size of the aperture to be formed in the film 10'. The preformed aperture in this instance is made by a heated fid or blade 28 centrally piercing the film 10' in the area of the apertures 24 and 26. Further, downward thrust of the fid or blade 28 causes the aperture made by the initial piercing to shrink back and form the thickened flexible ring 14. In this instance, the heat is being applied by conduction from the fid or blade 28.

Referring now to FIGURE 6, a package utilizing the method of the present invention is disclosed. In more detail, the package is a container or bag 30 made of biaxially oriented irradiated polyethylene and provided with a plurality of apertures 32 therein. The bag 30 may be provided with a string handle 34 which is anchored in a heat seal 36. It will be understood that the bag, which is adapted to receive a food product at least partially soluble in a liquid such as tea, coffee or the like, may take other shapes and may be formed from sheet or tubular heat shrinkable polyethylene film or the like.

By providing a bag of heat shrinkable material having apertures in its walls, a new and novel package results. The bag 30 filled with the food product may be inserted, for example, into a cup of hot water and the water can flow through the apertures 32 and saturate the food product. Also, the heat of the water will cause the bag to shrink as its contents are being dissolved, the shrinkage causing the flavor to be expressed from the food product through the apertures into the cup.

Referring now to FIGURES 7 through 14 inclusive, another means of forming an aperture in a film of heat shrinkable material is illustrated. The film 40 is biaxially oriented heat shrinkable material of a polymer of an olefin having two to three carbon atoms as previously described. In this form of the invention, a preformed aperture is made in the film, the preformed aperture having a thinned out or feathered edge. Heat is then applied to a localized area about the aperture causing the film to shrink back and thicken and form an aperture of increased size having a thickened flexible edge. By providing a preformed aperture in the film which has a thinned out or feathered edge, the material of the thinned out feathered edge has both a high degree of shrink and a high susceptibility to heat due to its low mass. Thus, as soon as heat is applied the film in the area of the feathered edge, the edge begins to shrink back and thicken and any imperfection in the edge will not propagate as the strain in the material has been reduced because of the thickness of the edge in relation to the remaining portion of the film.

Referring now specifically to FIGURE 7, a machine for making a preformed hole or aperture in the film 40 is illustrated and comprises a roller 42 having hobnails or rounded projections 44 suitably spaced on its peripheral surface. Cooperating with the roller 42 is a smooth surfaced roller 46, the smooth surfaced roller 46 rotating at the same surface speed as the roller 42. The film 40 is fed between the nip of the rollers 42 and 46 and the hobnails or rounded projections 44 engaging the film and causing it to flatten out, a small hole being formed therein and the film adjacent the hole a thinned out or feathered edge. The apparatus shown in FIGURE 7 would provide a hole in the film 40 by pressure of the hobnails or rounded projections 44 on the film against the roller 46 which in this case would be acting as an anvil.

Referring to FIGURES 8 and 9, still another form of apparatus is shown for providing the preformed holes or apertures in the film 40, the apertures having a thinned out or feathered edge. The apparatus of FIGURES 8 and 9 includes a roller 48 provided with hobnails or rounded projections 50 on its peripheral surface and a coacting cylindrical roller 52 having a plurality of tapered holes 54 in its outer periphery cooperating with the hobnails or projections 50. The interior of the cylinder 52 is connected with a suitable source of vacuum for removing the center portion of the hole cut from the film 40 as shown in FIGURE 9. Roller 48 and cylinder 52 rotate at the same surface speed so that the holes 54 in the cylinder 52 mate with the hobnails or projections 50 of the roller 48 as the film 40 passes therebetween. In order that vacuum will not be lost through the holes 54 when they are in a position other than the position for preforming an aperture in the film, the cylinder 52 may be provided with a stationary internal shield 56 to cover the holes 54 except when the holes are actually mating with the hobnails or projections 50. As shown in FIGURES 8 and 9, the stationary shield 56 is provided with an opening 58 at a point where the hole 54 mates with the hobnail or projection 50 of roller 48.

As shown in FIGURE 9, as the film passes between the roller 48 and the cylindrical roller 52, the pressure of the hobnail or projection 50 on the film 40 causes a center section 60 to be punched from the film, the center section being drawn through the hole 54 into the center of the roller 52 by the vacuum. The inwardly tapered edge of the hole 54 cooperating with the curved surface of the hobnail or projection 50 thins out the edge of the preformed hole in film 40 so that the edge is relatively feathered as shown at the right hand side of the figure. By utilizing the apparatus of FIGURES 8 and 9, a slightly larger preformed hole can be provided in the film 40 than by the apparatus of FIGURE 7 where pressure alone is utilized to cause a very small hole.

FIGURE 11 illustrates the application of heat by a suitable heating unit 62 to the film 40 in the area of the preformed hole. Since the edge of the hole is feathered, the high shrink energy of the thin film in this area causes it immediately to shrink back and thicken, as shown in FIGURE 10.

Continued application of the heat will result in the aperture enlarging to the configuration shown in FIG- URE 11. The bead or edge 64 is substantially thicker than the thickness of the film 40 and, of course, it will be less oriented, yet retain its flexibility and have a higher tear resistance than the material of the film 40. While the heating unit 62 is shown applying heat to a localized area, it is, of course, within the scope of the invention to utilize insulating means such as previously described in the specification to prevent the heat from spreading to areas of the film other than the area immediately adjacent the preformed hole.

It is also possible to take the film 40 with apertures therein and completely wrap an article and seal the package and then apply heat to the wrapped package to shrink the film tightly around the package and simultaneously to thicken the film around the periphery of the aperture.

In accomplishing the desired results that are set forth in the objects and advantages of the present invention, and as described in detail in the foregoing description, it will be perceived and obvious that the invention is susceptible to some changes and modifications, both as to the apparatus and resulting article, without departing from the principle and spirit thereof. For this reason, the terminology used in the specification is for the purpose of description and not of limitation, the scope of the invention being defined in the claims.

I claim:

1. An apparatus for forming hole in a film of heat shrinkable material comprising: at least a pair of rotatable rollers arranged to rotate on parallel axes, one of said rollers having a rounded uninterrupted convex projection on its peripheral surface physically engaging the other of said rollers at the nip of said rollers whereby sufficient pressure is applied to the film by the rounded uninterrupted convex projection as the film passes between the nip of the rollers to form an aperture in the film with the edge portion of the film about the aperture being thinned, the other of said rollers being provided with a hole in its surface having a periphery engageable by mating with said rounded uninterrupted convex projection and through which the center portion of the material when the aperture is formed therein is received, and wherein an edge portion about the hole in the other of said rollers is concaved inwardly and complementary to the rounded uninterrupted convex projection of the one roller whereby the edge portion of the film about the formed aperture is thinned to a feathered edge.

2. An apparatus for forming an aperture in a film of heat shrinkable material comprising: a pair of rotatable mating rollers, one of said rollers having a rounded uninterrupted convex projection on its periphery, the other of said rollers being cylindrical and having its interior vacuumized, the other of said rollers also having a hole in its surface, said hole having its periphery engageable by and mating with the rounded uninterrupted convex projection on said one roller whereby sufficient pressure is applied to the film by the rounded uninterrupted convex projection to form an aperture in a film passing through the nip of said rollers, the portion punched out of the film being withdrawn through the hole in the cylindrical roller, and wherein the cylindrical roller has an edge portion about the hole in its periphery which is concaved inwardly and complementary to the rounded uninterrupted convex projection of the one roller whereby the edge portion of the film about the formed aperture is thinned to a feathered edge.

3. An apparatus for forming an aperture in a film of heat shrinkable material comprising: at least a pair of rotatable rollers arranged to rotate on parallel axes, one of said rollers having a rounded uninterrupted convex projection on its peripheral surface, the other of said rollers having a hole in its surface for cooperation with the said rounded uninterrupted convex projection, means to form a feathered edge, said means being disposed about the edge portion of the hole in the other of said rollers and said means physically engaging said rounded uninterrupted convex projection with sufficient pressure so that when the film passes therebetween, an aperture is formed in the film with the edge portion of the film about the aperture being thinned to a feathered edge.

4. An apparatus for forming an aperture in a film of heat shrinkable material comprising: at least a pair of rotatable mating rollers, one of said rollers having a rounded uninterrupted convex projection on its periphery, the other of said rollers being cylindrical and having a hole in its surface, said hole having its periphery engageable by and mating with the rounded uninterrupted convex projection on said one roller, means to form a feathered edge, said means being disposed about the edge portion of the hole in said other roller, said means physically engaging said rounded uninterrupted convex projection with sufficient pressure so that when the film passes therebetween, an aperture is formed in the film with the edge portion of the film about the aperture being thinned to a feathered edge, and vacuum means to withdraw the portion punched out of the film through the hole in said other roller.

References Cited by the Examiner
UNITED STATES PATENTS

| | | |
|---|---|---|
| 1,497,980 | 6/24 | Johnston. |
| 1,750,708 | 3/30 | Edwards. |
| 1,890,424 | 12/32 | Whitworth. |
| 2,068,456 | 1/37 | Hooper. |
| 2,497,212 | 2/50 | Donofrio _____ 18—21 X |
| 2,662,246 | 12/53 | Klugh et al. _____ 18—21 |

WILLIAM J. STEPHENSON, *Primary Examiner.*